United States Patent [19]

Richardson

[11] Patent Number: 4,644,131

[45] Date of Patent: Feb. 17, 1987

[54] ELECTRODE SUPPORT FOR GAS ARC WELDING TORCH HAVING COAXIAL VISION

[75] Inventor: Richard W. Richardson, Columbus, Ohio

[73] Assignee: The Ohio State University Research Foundation, Columbus, Ohio

[21] Appl. No.: 854,510

[22] Filed: Apr. 22, 1986

[51] Int. Cl.[4] .............................................. B23K 9/10
[52] U.S. Cl. ................... 219/124.34; 219/75; 219/130.01
[58] Field of Search ................ 219/124.34, 75, 130.01

[56] References Cited

U.S. PATENT DOCUMENTS

| | | | |
|---|---|---|---|
| 2,784,294 | 3/1957 | Gravert | 219/75 |
| 4,450,339 | 5/1984 | Corby, Jr. | 219/124.34 |
| 4,488,032 | 12/1984 | Case, Jr. | 219/124.34 |
| 4,491,719 | 1/1985 | Corby, Jr. | 219/124.34 |
| 4,543,461 | 9/1985 | Hill | 219/75 |
| 4,581,518 | 4/1986 | Takahashi et al. | 219/75 |

*Primary Examiner*—Clifford C. Shaw

*Attorney, Agent, or Firm*—Frank H. Foster; Sidney W. Millard

[57] ABSTRACT

An improved electrode mounting structure for a gas tungsten arc welding torch having a coaxial imaging system. The electrode mounting structure includes a support having a central hub and a plurality of spokes which extend from the hub generally radially with respect to the axis of the torch into supporting engagement with the interior walls of the torch. The spaces between the spokes are optical passages for transmission of light to form the image. A tubular collet holder is threadedly engaged at its upper end to the hub and extends downwardly toward the open end of the torch. The collet holder has an inwardly tapering constriction near its lower end. An electrode-retaining, tubular collet is mounted within the collet holder and has a longitudinally split and tapered end seating against the tapered constriction. A spring seats against the upper end of the collet and forces the split end against the tapered constriction to wedge the split end radially inwardly to grip the electrode within the collet.

10 Claims, 4 Drawing Figures

ELECTRODE SUPPORT FOR GAS ARC WELDING TORCH HAVING COAXIAL VISION

The invention described herein was made in performance of work under NASA Contract Number NAS8-35595 and is subject to the provisions of Section 305 of The National Aeronautics and Space Act of 1958 (72 Stat. 434; 42 USC 2457).

TECHNICAL FIELD

This invention relates generally to a welding torch for use in a gas arc welder which has automatic weld control utilizing an optical sensing vision system and more particularly relates to an improved electrode mount for supporting the electrode during the welding operation in a manner which provides both adequate heat conduction away from the electrode and sufficient axial light passage to permit the formation of an optical image of the weld scene at the opposite end of the torch.

BACKGROUND ART

Gas arc welding with automatically controlled, robotic systems has been increasingly investigated and used because of the improvements it offers in productivity and weld consistency. Such welding systems have been developed in which the control system detects the weld joint and weld conditions by the formation of an optical image of the area around the arc and the projection of that image onto a video sensor for electronic analysis. One of the most desirable welding systems utilizes a generally tubular torch having the electrode extending from its open lower end and having an internal lens for focusing an image of the weld scene upon the end of a fiber optics cable which extends into the opposite, upper end of the torch. Torches of this type are shown in U.S. Pat. Nos. 4,450,339; 4,488,032; and 4,491,719. Still other torches have TV cameras mounted directly to the torch.

It is desirable that the electrode be mounted in the torch in a manner which facilitates its easy replacement and adjustment with a minimum of manual manipulation since this is done often during production. Not only must the electrode be easily changeable and yet held rigidly during operation but, in addition, it is desirable that it be supported in a manner which can provide substantial heat flow to allow transfer of heat from the electrode out of the torch at a high rate while simultaneously not blocking the optical path between the arc region and the end of the fiber optic cable. It is also desirable that the electrode support system provide a light blocking or masking means around the axis of the electrode to prevent image distortion caused by the excessively intense light radiating from the arc itself.

The electrode in the three patents cited above is supported by a cantilevered strut extending to the axis of the torch. Although that electrode support does provide an adequately open and unblocked optical passageway from the arc region to the image detecting system, it has a heat flow path having a relatively small cross section and relatively small contact area with the electrode and therefore provides inadequate thermal conductivity.

One object and feature of the present invention is to provide an electrode mounting structure which greatly improves the total cross section of the heat transfer path in order to allow a higher heat conduction rate from the electrode to the torch body while at the same time not blocking the vision of the imaging system.

The electrode mounting structure of the above three patents also requires a separate collar for blocking the light in the immediate vicinity of the arc. It is an object of the present invention to eliminate the need for this separate collar and therefore its manipulation during electrode change or adjustment while maintaining blockage of the intense light from the immediate vicinity of the arc.

It is another object and purpose of the present invention to provide an electrode mounting structure which can accomplish all of these purposes and yet permit the electrode to be easily and conveniently changed or adjusted from the open end of the torch.

BRIEF DISCLOSURE OF INVENTION

An electrode support embodying the present invention has a central hub and a plurality of spokes which extend from the hub generally radially outwardly from the axis of the torch into supporting engagement with the interior walls of the torch. Optical passages exist between the spokes to permit the passage of light for image forming. A tubular collet holder is mounted at one end to the hub and extends toward the open end of the torch. The collet holder has an inwardly extending constriction. An electrode-retaining, tubular collet is positioned within the collet holder and has a longitudinally split end seating against the constriction. A means is provided in the collet holder for forcing the split end of the collet against the constriction to apply a radially inwardly gripping force against the electrode contained within the collet.

Figure 1:
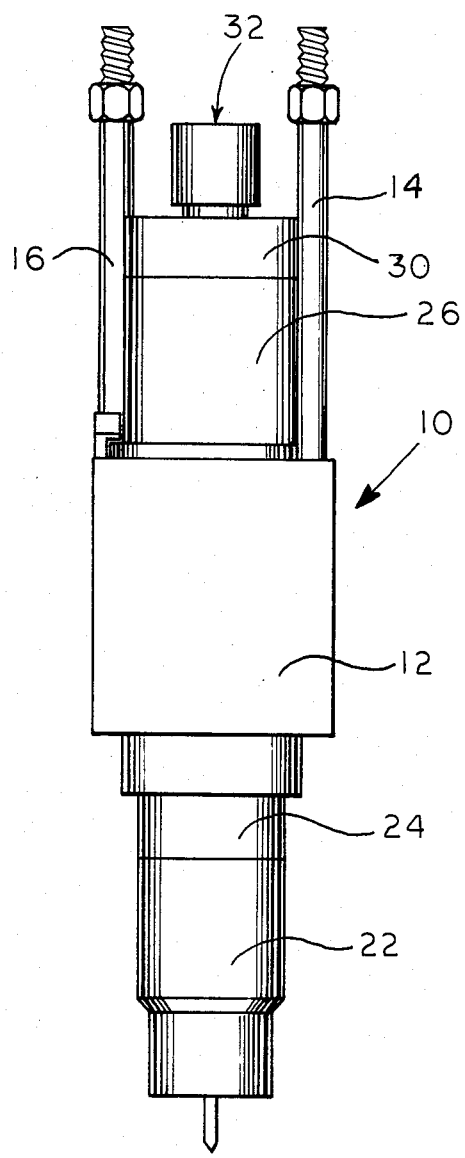
FIG. 1 is a view in side elevation of a torch embodying the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose.

DETAILED DESCRIPTION

Figure 2:
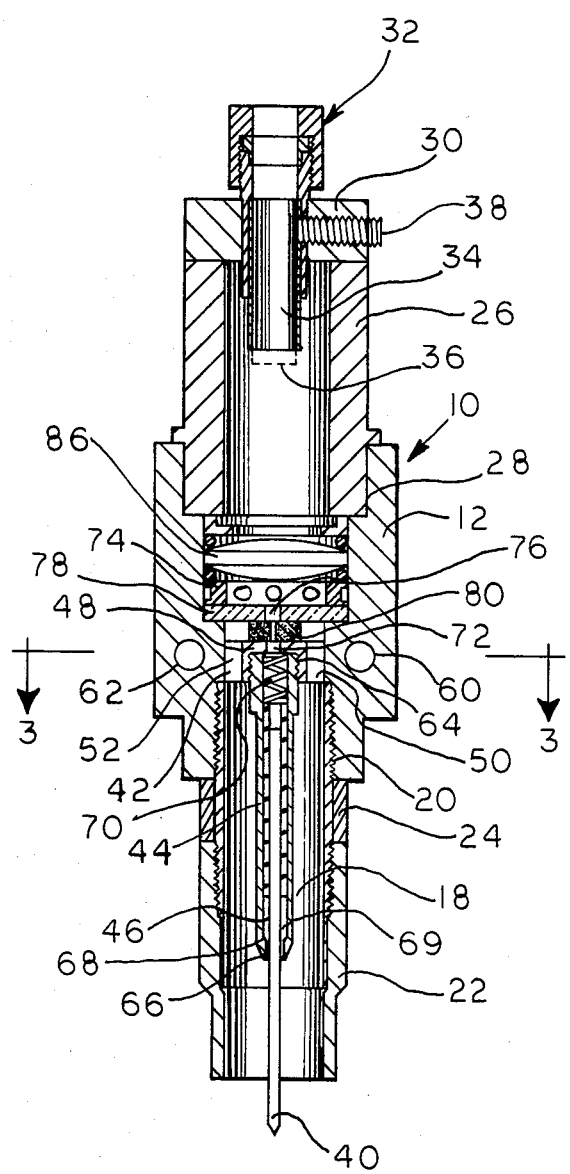
FIG. 2 is a view in vertical section axially through the center of the embodiment of FIG. 1.
Figure 3:
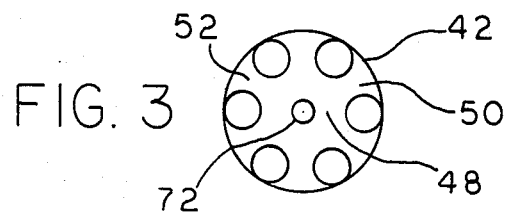
FIG. 3 is a view in horizontal section taken substantially along the line 3—3 of FIG. 2 illustrating the spoked collet support of the present invention.

The torch 10 embodying the present invention is illustrated in FIGS. 2 and 3. The torch has an outer, tubular jacket formed by the assembly of several component parts. The central segment of the torch is a main torch body 12 which has a square cross section perpendicularly to the longitudinal axis of the torch 10. The torch body 12 is machined from a block of solid copper to provide good thermal conductivity. The body 12 is also provided in the conventional manner with internal passages which connect to three fluid conducting tubes 14, 16 and a third which is not visible. One fluid conducting tube provides cooling water for flowing through the body 12 and the second conducts the heated cooling water away from the body 12. The third tube supplies the inert gas.

A copper, gas cup tube 18 is threadedly engaged in the lower port 20 of the torch 10. A standard, ceramic gas cup 22 is threadedly engaged to the gas cup tube 18 and separated from the torch body 12 by an annular, insulating spacer 24.

An outer optical cable support tube 26 is attached to an upper port 28 of the torch body 12. It supports an end cap 30 to which the physical supports 32 for the optical cable are mounted. The internal cable stabilizer tube 34 supports the fiber optic cable so that the image of the weld may be focused upon the end 36 (illustrated in phantom) of the fiber optic cable. The fiber optic cable is vertically adjusted by sliding the inner support tube 34 until the image is focused and then tightening it in place with a set screw 38.

Together these components of the torch, which have been described above, comprise an outer gas confining tubular jacket having an open lower end at which the welding occurs and an optical image receiving structure at its upper end which will receive images from light rays which travel generally coaxially through the weld torch 10. This image is applied to the weld control system which analyzes the images and positions the weld torch automatically in response to that analysis.

The welding electrode 40 projects from the lower open end of the torch and is mounted to the torch by means of a support 42, a collet holder 44 and a collet 46.

The support 42, shown also in FIG. 3, has a central hub 48 and a plurality of spokes, such as spokes 50 and 52, which extend from the hub generally radially with respect to the axis of the torch body into supporting engagement with the interior walls of the torch body 12. This support with its spokes are formed by providing six circular holes spaced at 60 degree angular intervals about the center of the support 42. The purpose of the support is to rigidly maintain the electrode 40 in position and simultaneously provide good thermal, electrical and mechanical contact between the electrode and the torch body while at the same time permitting coaxial viewing. The six holes provide optical passages through which light can pass to form the image. They also provide distributed passages through which the gas passes in a uniform flow. The spokes also provide evenly distributed thermal and electrical conduction paths of relatively high cross sectional area for minimizing thermal and electrical resistance. Cooling water passages, such as passages 60 and 62 are formed on the four sides of the torch body 12 as close as is practical to the outer ends of the spokes of the support 42.

A threaded bore 64 extends axially, partially through the hub 48 for threaded engagement with the upper threaded end of the collet holder 44. This tubular collet holder 44 is threadedly mounted at one end to the hub and extends toward the lower open end of the tubular jacket forming the torch. The tubular collet 44 has an inwardly extending constriction 66 formed at its lower end. The upper surface of the constriction 66 is a tapered shoulder 68.

The electrode-retaining tubular collet 46 is mounted within the collet holder 44. The lower end of the collet is longitudinally split by means of a diametrical slot 69, oriented perpendicularly to the plane of the FIG. 2 section. Additionally, the lower-most end of the collet 46 is tapered for seating against the internal tapered shoulder 68 of the collet holder 44.

A helical spring 70 is positioned in the collet holder at a position spaced from the constriction 66 and seats against the end of the collet 46 which is opposite its split end. The spring 70 provides a means for applying an axial force upon the collet to force the split end against the constriction 66 wedging it inwardly to apply a radially inward gripping force against the electrode contained within the collet and retain the electrode in its position. To accomplish this, the tapered constriction 66 is spaced from the bottom of the partial bore 64 in the support 42 by a distance which is less than the sum of the length of the collet and the uncompressed length of a spring. Thus, when the collet holder 70 is screwed into the support 42, the spring is compressed to provide a downward thrust on the collet 46. The use of the spring allows the collet holder 44 to be tightened into good thermal contact with the support 42 while permitting some variation in the length and taper of the collet 46. The electrode 40 can easily be axially adjusted into the desired position, and then the collet holder 42 is tightened to hold the electrode in position. The use of the helical spring and a small central bore 72 through the support 42 permits the electrode to extend through the support 42. This electrode mounting arrangement allows relatively convenient adjustment, removal and/or replacement of the electrode and also replacement of the collet holder and collet in the event of damage.

Heat is conducted away from the electrode through the collet and collet holder to the support 42. Thus, the heat transfer path to the supporting structure is not limited to the electrode itself as in the above cited three patents. In addition, of course, the multiple spokes of the support 42 provide multiple heat conduction paths away from the electrode/collet assembly to the torch body.

Shielding gas is supplied into the torch through passages formed in the torch body 12. One or more ports extend from the interior chamber wall of the torch into these gas supply passages. A annular gas injection spacer 74 is provided with a circular groove about its periphery which registers with those ports. A plurality of evenly spaced, radial holes extend inwardly in the spacer 74 from the peripheral groove to permit gas to flow into the torch. The gas injection spacer provides an open, central chamber for accumulation of gas and guides the flow of the gas through the evenly spaced radial holes to improve the uniformity of the gas flow. The gas flows from the central chamber of the gas injection spacer 74 through a central hole 76 through a filter window 78 and into a central axial hole of a gas diffuser 80. The gas diffuser 80 is an annular ring of porous material which is sealed between the spoked electrode mounting support 48 and the filter window 78. This provides a uniform flow of gas into the passages between the spokes of the electrode mounting support 48 from which it flows downward through the gas cup tube 18 and out through the lower end of the gas cup 22. The smooth, nonturbulent flow is is important and needed to avoid the entrainment of air in the flowing gas which would be detrimental to weld quality.

A torch lens 86 focuses the weld scene onto the end 36 of the fiber optic cable. The lens 86 is held in place by a pair of O-rings which are compressed against the opposite peripheral edges of the lens.

Because the image which is focused on the end 36 of the fiber optic cable is formed by light which passes between the spokes of the support 42, the lens 86 must have a sufficient diameter to refract light from the weld scene onto the end 36 of the fiber optic cable.

Figure 4:
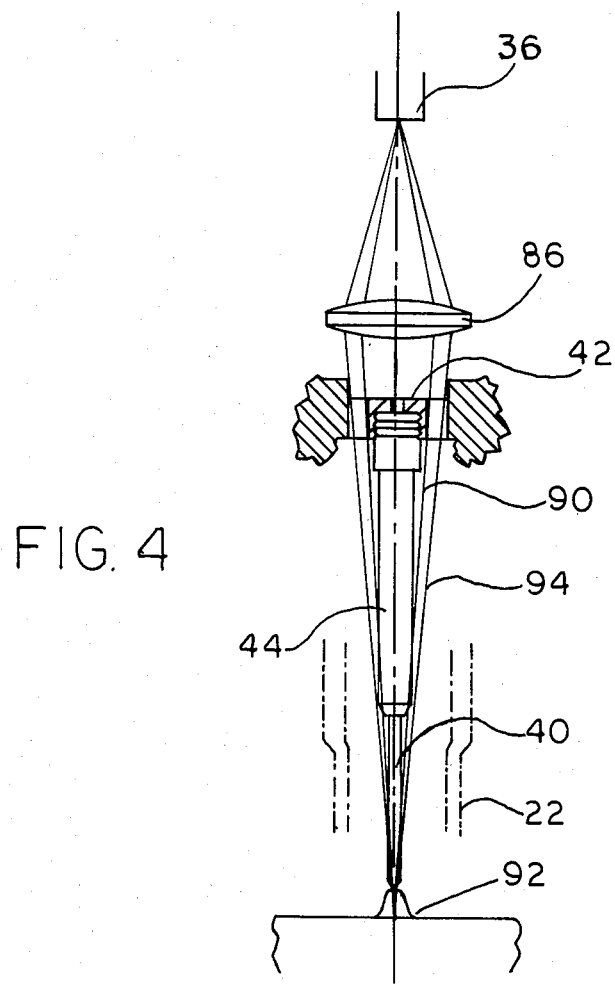
FIG. 4 is a diagrammatic view illustrating the optics of the embodiment of FIGS. 1-3.

Referring to FIG. 4, a light ray 90 from the weld scene 92 is illustrated which makes the smallest possible angle with the central axis which a light ray can make and still pass through one of the six holes in the electrode support 42 and strike the lens 86. Thus, the lens 86 must have a minimum radius of at least the radial distance from the axis to the light ray 90 at the position of the lens.

Similarly, the light ray 94 from the weld seam 92 makes the maximum possible angle with the central axis that a light ray can make and still pass between the spokes and onto the lens. Thus, the lens need have a diameter no greater than is necessary to refract such a light ray onto the end of the fiber optic cable 36.

In this embodiment with coaxial viewing, the electrode 40 and the electrode collet holder 44 form a shield which masks the brightest part of the weld image, the arc. If the diametrical spacing between the holes in the electrode support 42 and the diameter of the lens are increased, then light rays which make a greater angle with the central axis are also focused onto the image. As light rays of a greater angle are focused, more light rays from the more intense arc are focused and tend to cause an excessively bright arc halo about the electrode shadow in the image. For this reason it is not necessarily desirable that the lens extend even all the way to the outer limits to refract the light ray 94.

In the embodiment of the invention illustrated in FIGS. 1-3 the electrode support 42 has its six holes centered at a radius of 7.7 millimeters from the axis of the support 42. Each hole has a 6 millimeter diameter. In the preferred embodiment this provides a minimum lens diameter of 9.4 millimeters in order and a maximum lens diameter of 21.4 millimeters. Based on a subjective visual judgment of the optimum tolerable arc halo, the preferred lens was chosen to have an 18 millimeter diameter and a 29 millimeter focal length.

Of course, there can be any number of holes and importantly the electrode support can be formed with light passages and spokes of different shapes. The spokes can be more nearly linear, radial beams.

While certain preferred embodiments of the present invention have been disclosed in detail, it is to be understood that various modifications may be adopted without departing from the spirit of the invention or scope of the following claims.

I claim:

1. An improved gas tungsten arc welding torch of the type having a tubular jacket, a centrally mounted electrode projecting from an open end of the tubular jacket and an internal, coaxial imaging vision system for attachment to a weld control means, wherein the improvement is an electrode mounting structure comprising:
   (a) a support having a central hub and a plurality of spokes which extend from the hub generally radially with respect to the axis of said tubular jacket into supporting engagement with the interior walls of said jacket and having optical passages between the spokes;
   (b) a tubular collet holder mounted at one end to the hub and extending toward the open end of the tubular jacket, the collet holder having an inwardly extending constriction;
   (c) an electrode-retaining, tubular collet within the collet holder and having a longitudinally split end seating against said constriction; and
   (d) means in said collet holder spaced from said constriction and seating against the end of said collet opposite the split end for applying an axial force upon the collet to force the split end against the constriction and apply a radially inward gripping force against the electrode contained within the collet.

2. A welding torch in accordance within claim 1 wherein said constriction has a tapered shoulder for seating against the collet.

3. A welding torch in accordance with claim 1 wherein the collet has a tapered end for seating against the constriction.

4. A welding torch in accordance with claim 1 wherein the constriction has a tapered shoulder for seating against the collet and the collet has a tapered end for seating against the tapered shoulder.

5. A welding torch in accordance with claim 1 or 2 or 3 or 4 wherein said axial force applying means comprises a helical spring.

6. A welding torch in accordance with claim 5 wherein a threaded bore extends axially partially through said hub and the end of the collet holder is threadedly engaged in the threaded bore, wherein said spring seats against the bottom of said partial bore and wherein said tapered constriction is spaced from the bottom of the partial bore by a distance less than the sum of the length of the collet and the uncompressed length of the spring whereby tightening of the collet holder into the hub causes the spring to be compressed and force the collet against the constriction to thereby grip the electrode.

7. A welding torch in accordance with claim 6 wherein a lens is mounted coaxially within the tubular jacket on the opposite side of the support from the open end of the jacket.

8. A welding torch in accordance with claim 7 wherein the a fiber optics cable support tube extends coaxially into the tubular jacket on the side of the lens opposite the support.

9. A welding torch in accordance with claim 8 wherein an annular gas diffuser block of porous material is mounted between said support and said lens and a gas inlet means is mounted between the gas diffuser block and the lens.

10. A welding torch in accordance with claim 9 wherein an axial hole smaller than the spring diameter and larger than the internal passage of the collet is provided through the hub to permit the electrode to extend through said hole.

* * * * *